United States Patent
Wang et al.

(10) Patent No.: US 12,129,400 B1
(45) Date of Patent: Oct. 29, 2024

(54) METHOD FOR PREPARING ALKALINE RED MUD COATING FOR PREVENTING MARINE ORGANISM ATTACHMENT

(71) Applicant: Taishan University, Tai'an (CN)

(72) Inventors: Qing Wang, Tai'an (CN); Zhe Li, Tai'an (CN); Rui Zhang, Tai'an (CN)

(73) Assignee: Taishan University, Tai'an (CN)

( * ) Notice: Subject to any disclaimer, the term of this patent is extended or adjusted under 35 U.S.C. 154(b) by 0 days.

(21) Appl. No.: 18/655,729

(22) Filed: May 6, 2024

(30) Foreign Application Priority Data

May 15, 2023 (CN) .......................... 202310552335.3

(51) Int. Cl.
```
C09D 5/16       (2006.01)
C08K 11/00      (2006.01)
C09D 163/00     (2006.01)
```

(52) U.S. Cl.
CPC ......... C09D 5/1606 (2013.01); C09D 5/1662 (2013.01); C09D 163/00 (2013.01); *C08K 11/005* (2013.01)

(58) Field of Classification Search
CPC ........ C09D 163/00; C09D 5/08; C09D 5/082; C09D 5/084; C09D 5/16; C09D 5/1618; C08G 59/44
See application file for complete search history.

(56) References Cited

FOREIGN PATENT DOCUMENTS

| | | | | |
|---|---|---|---|---|
| CN | 105949954 A | * | 9/2016 | .......... C09D 163/00 |
| CN | 110079130 A | * | 8/2019 | ............ C09C 1/407 |
| CN | 112625595 A | | 4/2021 | |
| CN | 113248792 A | * | 8/2021 | ............... C08K 3/22 |
| CN | 114479359 A | * | 5/2022 | ............. C08L 63/02 |
| CN | 115558374 A | * | 1/2023 | .......... C09D 163/00 |
| CN | 116496680 B | | 7/2023 | |

OTHER PUBLICATIONS

Park (Effect of Acidic Surface Treatment of Red Mud on Mechanical Interfacial Properties of Epoxy/Red Mud Nanocomposites, Journal of Colloid and Interface Science, 251, 2002, pp. 225-229).*
Machine translation of CN 105949954 (2016, 5 pages).*

(Continued)

*Primary Examiner* — Brieann R Johnston
(74) *Attorney, Agent, or Firm* — M&B IP Analysts, LLC

(57) ABSTRACT

Provided is a method for preparing an alkaline red mud coating for preventing marine organism attachment, including: (1) mixing stearic acid and absolute ethanol by stirring to obtain a mixed solution; (2) mixing the mixed solution and a red mud powder to obtain a mixture, and drying the mixture to obtain a modified hydrophobic red mud powder; (3) adding benzyl glycidyl ether into an epoxy resin and conducting dispersion to be uniform to obtain a mixed system, adding the modified hydrophobic red mud powder into the mixed system, continuing the dispersion to be uniform to obtain a blend, and grinding the blend to obtain an antifouling coating material; and (4) during use, mixing the antifouling coating material with a polyamide curing agent to obtain a mixture system, and applying the mixture system onto a surface of building to form the alkaline red mud coating for preventing marine organism attachment.

3 Claims, 3 Drawing Sheets

(56) References Cited

OTHER PUBLICATIONS

Machine translation of CN 110079130 (2019, 17 pages).*
Machine translation of CN 113248792 (2021, 18 pages).*
Machine translation of CN 114479359 (2022, 18 pages).*
Machine translation of CN 115558374 (2023, 8 pages).*
Notification to Grant for CN 202310552335.3, dated Jan. 13, 2024. China National Intellectual Property Administration Patent Office, Beijing, China.

* cited by examiner

METHOD FOR PREPARING ALKALINE RED MUD COATING FOR PREVENTING MARINE ORGANISM ATTACHMENT

CROSS-REFERENCE TO RELATED APPLICATION

This patent application claims the benefit and priority of Chinese Patent Application No. 202310552335.3 entitled "Method for preparing alkaline red mud coating for preventing marine organism attachment", filed with the China National Intellectual Property Administration on May 15, 2023, the disclosure of which is incorporated by reference herein in its entirety as part of the present application.

TECHNICAL FIELD

The present disclosure relates to the field of marine antifouling coating materials, in particular to a method for preparing an alkaline red mud coating for preventing marine organism attachment.

BACKGROUND

Marine biofouling has become a thorny problem in front of human beings since the beginning of human activities related to the ocean. Attaching organisms along the coast are mainly divided into two categories: algae and mollusks. After these attaching organisms multiply on concrete surfaces, if they are not cleaned up in time, they will accelerate the corrosion of underwater buildings and hinder the inspection, maintenance and repair of underwater buildings.

Prevention and control methods of marine fouling organisms are divided into three categories: physical antifouling, chemical antifouling and biological antifouling. Among them, the physical antifouling is mainly to remove or interfere the attachment behavior of marine organisms through physical methods, most of which are realized by antifouling coating materials. Moreover, the lower the surface energy of an object would make it more difficult for marine organisms to attach thereto, and thus materials with lower surface energy could be used as coatings to make it difficult for fouling organisms to attach thereto and grow. At present, the low surface energy antifouling coating materials for preventing marine organism attachment are mainly selected from nanomaterials or obtained by modifying fluorine-containing organic compounds. However, nanomaterials are expensive and have limitations in practical applications. Fluorine-containing substances are not only expensive, but also a kind of toxic organic substances, which easily causes environment pollutions.

For example, Chinese publication No. CN112625595A discloses a nano-synergistic low-surface-energy antifouling composition and a preparation method thereof. The method includes firstly treating a starting material by using ethanol dispersant and propylene glycol methyl ether acetate to obtain a nano-zinc oxide slurry, and mixing the nano-zinc oxide slurry with a resin base material, ω-hydroxyl-terminated polydimethylsiloxane, tetraethyl silicate crosslinking agent, dibutyltin dilaurate catalyst, and 2,4-pentanedione solvent during use. This method results in an organic-inorganic nanocomposite polymer material with good antifouling ability and hard object scratch-resistance; however, modification with nanomaterials causes high production cost and is difficult to popularize and apply on a large scale. In addition, the organic substances such as dibutyltin dilaurate used in this method would have long-term adverse effects on the water environment.

SUMMARY

In view of the above technical problems, the present disclosure provides a method for preparing an alkaline red mud coating for preventing marine organism attachment. The present disclosure adopts the following solutions.

Provided is a method for preparing an alkaline red mud coating for preventing marine organism attachment, including the following steps:

(1) mixing stearic acid and absolute ethanol by stirring to obtain a mixed solution;

(2) fully mixing the mixed solution in step (1) and a red mud powder to obtain a mixture, and then drying the mixture to obtain a modified hydrophobic red mud powder;

(3) adding benzyl glycidyl ether into an epoxy resin and conducting dispersion to be uniform to obtain a mixed system, then adding the modified hydrophobic red mud powder in step (2) into the mixed system, continuing the dispersion to be uniform to obtain a blend, and grinding the blend to obtain an antifouling coating material; and (4) during use, mixing the antifouling coating material in step (4) and a polyamide curing agent to obtain a mixture system, and applying the mixture system onto a surface of a building to form the alkaline red mud coating for preventing marine organism attachment.

In some embodiments, in step (1), a mass ratio of the stearic acid to the absolute alcohol is in a range of 1:(20-30).

In some embodiments, in step (1), mixing stearic acid and absolute ethanol by stirring is conducted with a magnetic stirrer, and the stirring is conducted for 40 min to 60 min.

In some embodiments, in step (2), a mass ratio of the mixed solution to the red mud powder is in a range of (2-3):1; and the drying is conducted in an oven.

In some embodiments, in step (3), the epoxy resin is a bisphenol A epoxy resin.

In some embodiments, in step (3), in parts by weight, an amount ratio of the benzyl glycidyl ether, the epoxy resin, and the modified hydrophobic red mud powder is in a range of (2-6):(50-70):(15-20).

In some embodiments, in step (4), the polyamide curing agent is in an amount of 2-7% of a weight of the antifouling coating material.

Some embodiments of the present disclosure have the following benefits:

The antifouling coating material according to the present disclosure is an inorganic environmentally-friendly coating material with low surface energy, hydrophobicity and corrosion-resistance. The coating formed by such coating material could prevent the attachment of marine organisms, is environmentally-friendly and non-toxic, would not pollute the water body environment in the ocean, and furthermore has low preparation cost.

Red mud, a kind of industrial solid wastes with high alkalinity, is creatively used as a raw material in the method according to the present disclosure. On the one hand, the solid waste red mud generated in the alumina production process could be utilized, thus reducing the stockpiling of red mud and decreasing the preparation cost of coating. On the other hand, the high alkalinity characteristics of red mud could be effectively utilized, which has an inhibitory effect on the reproduction of marine bacteria and fungi, thereby effectively preventing the attachment and growth of marine organisms.

The stearic acid is used to modify the red mud with high alkalinity in the method according to the present so as to reduce the surface energy of the red mud meanwhile retaining high alkalinity, thereby obtaining a coating material with low surface energy and enhanced effect on preventing attachment of marine organisms. Moreover, the stearic acid is used as a modifier to provide low surface energy, which is non-toxic and pollution-free, and has good stability.

The antifouling coating material according to the present disclosure is obtained by compounding the modified hydrophobic red mud powder with a bisphenol A epoxy resin and benzyl glycidyl ether and defining the amount of each raw material. The antifouling coating material is then mixed with a polyamide curing agent, and a resulting mixture system is applied to obtain an alkaline red mud coating, which could not only effectively prevent the attachment and growth of marine organisms, but also has good mechanical properties.

DETAILED DESCRIPTION

The existing low surface energy antifouling coating material is obtained by using: (1) nanomaterials; and (2) fluorine-containing or silane-based modifiers. Nanomaterials are expensive and not easy to disperse, resulting in that the process for preparing the antifouling coating material is complicated. Fluorine-containing substances are toxic and would cause harm to the environment, and silane-based substances are unstable in structure.

Red mud is a kind of industrial solid waste with complex components and high alkalinity, which is generated during the alumina refining process. Currently, there is no better treatment means for these solid wastes, and the accumulation and storage of these solid wastes would cause soil pollution and also require a lot of maintenance costs.

In view of the above technical problems, the present disclosure provides a sustainable marine antifouling coating by utilizing the characteristics of high alkalinity and corrosion-resistance of red mud, which not only addresses the problem of utilization of red mud wastes, but also reduces the preparation cost. Moreover, the antifouling coating has a good effect on preventing the attachment and growth of marine organisms.

The present disclosure will be further described below in conjunction with specific examples.

Example 1

Figure 1:
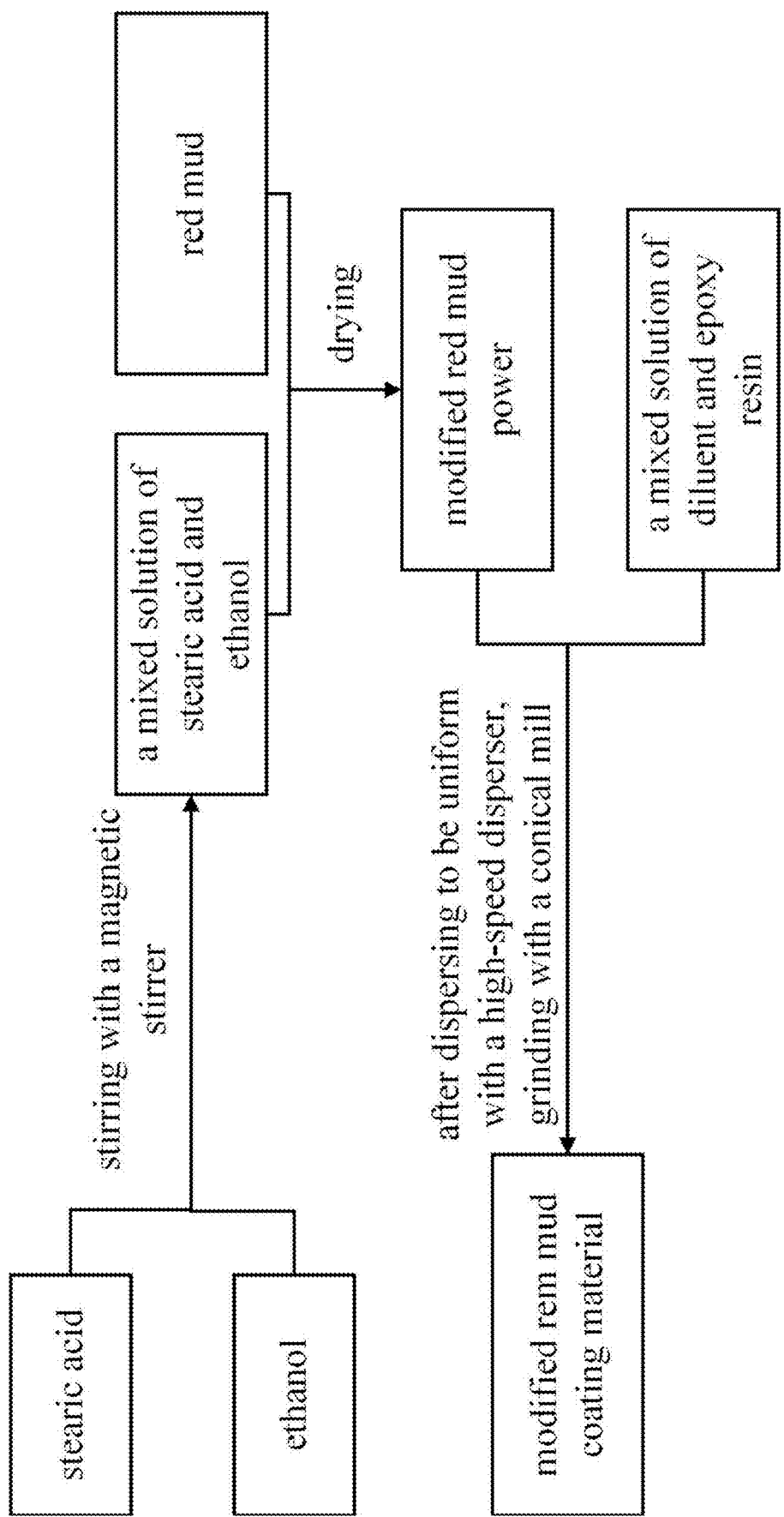
FIG. 1 shows a process flowchart of a method for preparing an alkaline red mud coating for preventing marine organism attachment according to an embodiment of the present disclosure.

As shown in FIG. 1, a method for preparing an alkaline red mud coating for preventing marine organism attachment was conducted as follows:

(1) Stearic acid and absolute ethanol were mixed by stirring with a magnetic stirrer for 40 min to obtain a mixed solution, where the mass ratio of the stearic acid to the absolute ethanol was 1:20.

(2) The mixed solution in step (1) and the red mud powder were mixed fully, and a resulting mixture was then dried in an oven to obtain a modified hydrophobic red mud powder, where the mass ratio of the mixed solution to the red mud powder was 2:1.

(3) Benzyl glycidyl ether (692 diluent) was added into a bisphenol A epoxy resin, and dispersed to be uniform at a low dispersion speed of 300 rpm with a high-speed disperser. The hydrophobic red mud powder in step (2) was then added thereto, and dispersed to be uniform at a high dispersion speed of 900 rpm to obtain a blend. After that, the blend was ground to a desirable fineness with a conical mill to obtain an antifouling coating material.

In parts by weight, the amount ratio of the benzyl glycidyl ether, the bisphenol A epoxy resin, and the hydrophobic red mud powder was 2:50:20.

(4) During use, the antifouling coating material in step (4) was mixed with a polyamide curing agent, where the polyamide curing agent was in an amount of 3% of a weight of the antifouling coating material. After being mixed to be uniform, a resulting product was applied onto a surface of a building to form an alkaline red mud coating for preventing marine organism attachment.

It has been found that an alkaline environment has an inhibitory effect on the reproduction of marine bacteria and fungi, and it is not easy for marine organisms to attach onto the surface of objects with lower surface energy. Therefore, modifying the high-alkalinity red mud with stearic acid allows the red mud to have a reduced surface energy and meanwhile retain high alkalinity, thereby obtaining a low surface energy coating material, which could make marine organisms less susceptible to attachment.

The red mud used in the method according to the present disclosure is waste in the alumina production process, and has large output. The high alkalinity of the red mud is also beneficial to prevent marine organism attachment. The use of red mud conforms to the concept of sustainable development. Further, in the present disclosure, stearic acid is used as a modifier to modify the highly-alkaline red mud to obtain a low surface energy substance, which is non-toxic and environmentally-friendly and has a good stability.

Example 2

A method for preparing an alkaline red mud coating for preventing marine organism attachment was conducted as follows:

(1) Stearic acid and absolute ethanol were mixed by stirring with a magnetic stirrer for 60 min to obtain a mixed solution, wherein the mass ratio of the stearic acid to the absolute ethanol was 1:30.

(2) The mixed solution in step (1) and the red mud powder were mixed fully, and a resulting mixture was then dried in an oven to obtain a modified hydrophobic red mud powder, wherein the mass ratio of the mixed solution to the red mud powder was 3:1.

(3) Benzyl glycidyl ether (692 diluent) was added into a bisphenol A epoxy resin, and dispersed to be uniform at a low dispersion speed of 300 rpm with a high-speed disperser. The hydrophobic red mud powder in step (2) was then added thereto, and dispersed to be uniform at a high dispersion speed of 900 rpm to obtain a blend.

After that, the blend was ground to a desirable fineness with a conical mill to obtain an antifouling coating material.

In parts by weight, the amount ratio of the benzyl glycidyl ether, the bisphenol A epoxy resin, and the hydrophobic red mud powder was 6:50:15.

(4) During use, the antifouling coating material in step (4) was mixed with a polyamide curing agent, where the polyamide curing agent was in an amount of 2% of a weight of the antifouling coating material. After being mixed to be uniform, a resulting product was applied onto a surface of a building to form an alkaline red mud coating for preventing marine organism attachment.

Example 3

A method for preparing an alkaline red mud coating for preventing marine organism attachment was conducted as follows:
(1) Stearic acid and absolute ethanol were mixed by stirring with a magnetic stirrer for 50 min to obtain a mixed solution, wherein the mass ratio of the stearic acid to the absolute ethanol was 1:25.
(2) The mixed solution in step (1) and the red mud powder were mixed fully, and a resulting mixture was then dried in an oven to obtain a modified hydrophobic red mud powder, wherein the mass ratio of the mixed solution to the red mud powder was 2.5:1.
(3) Benzyl glycidyl ether (692 diluent) was added into a bisphenol A epoxy resin, and dispersed to be uniform at a low dispersion speed of 250 rpm with a high-speed disperser. The hydrophobic red mud powder in step (2) was then added thereto, and dispersed to be uniform at a high dispersion speed of 800 rpm to obtain a blend. After that, the blend was ground to a desirable fineness with a conical mill to obtain an antifouling coating material.

In parts by weight, the amount ratio of the benzyl glycidyl ether, the bisphenol A epoxy resin, and the hydrophobic red mud powder was 3:70:20.

(4) During use, the antifouling coating material in step (4) was mixed with a polyamide curing agent, where the polyamide curing agent was in an amount of 7% of a weight of the antifouling coating material. After being mixed to be uniform, a resulting product was applied onto a surface of a building to form an alkaline red mud coating for preventing marine organism attachment.

Example 4

A method for preparing an alkaline red mud coating for preventing marine organism attachment was conducted as follows:
(1) Stearic acid and absolute ethanol were mixed by stirring with a magnetic stirrer for 60 min to obtain a mixed solution, where the mass ratio of the stearic acid to the absolute ethanol was 1:20.
(2) The mixed solution in step (1) and the red mud powder were mixed fully, and a resulting mixture was then dried in an oven to obtain a modified hydrophobic red mud powder, wherein the mass ratio of the mixed solution to the red mud powder was 2:1.
(3) Benzyl glycidyl ether (692 diluent) was added into a bisphenol A epoxy resin, and dispersed to be uniform at a low dispersion speed of 300 rpm with a high-speed disperser. The hydrophobic red mud powder in step (2) was then added thereto, and dispersed to be uniform at a high dispersion speed of 700 rpm to obtain a blend. After that, the blend was ground to a desirable fineness with a conical mill to obtain an antifouling coating material.

In parts by weight, the amount ratio of the benzyl glycidyl ether, the bisphenol A epoxy resin to the hydrophobic red mud powder was 2:60:20.

(4) During use, the antifouling coating material in step (4) was mixed with a polyamide curing agent, where the polyamide curing agent was in an amount of 5% of a weight of the antifouling coating material. After being mixed to be uniform, a resulting product was applied onto a surface of a building to form an alkaline red mud coating for preventing marine organism attachment.

The benzyl glycidyl ether used in Examples 1 to 4 may be replaced by phenyl glycidyl ether (690 diluent).

Figure 2:
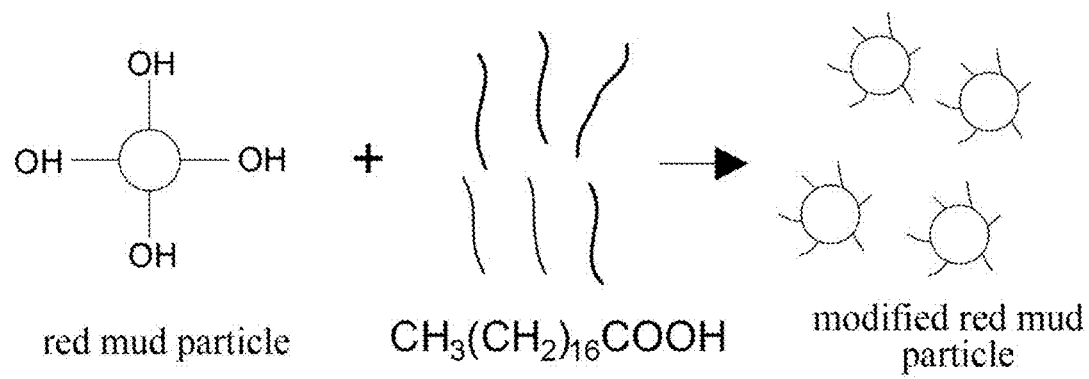
FIG. 2 shows a mechanism diagram of modification to red mud with stearic acid.

FIG. 2 shows a mechanism diagram of modification to red mud with stearic acid. It can be seen that the stearic acid is grafted onto the surface of red mud particles, thereby realizing the modification.

Figure 3:
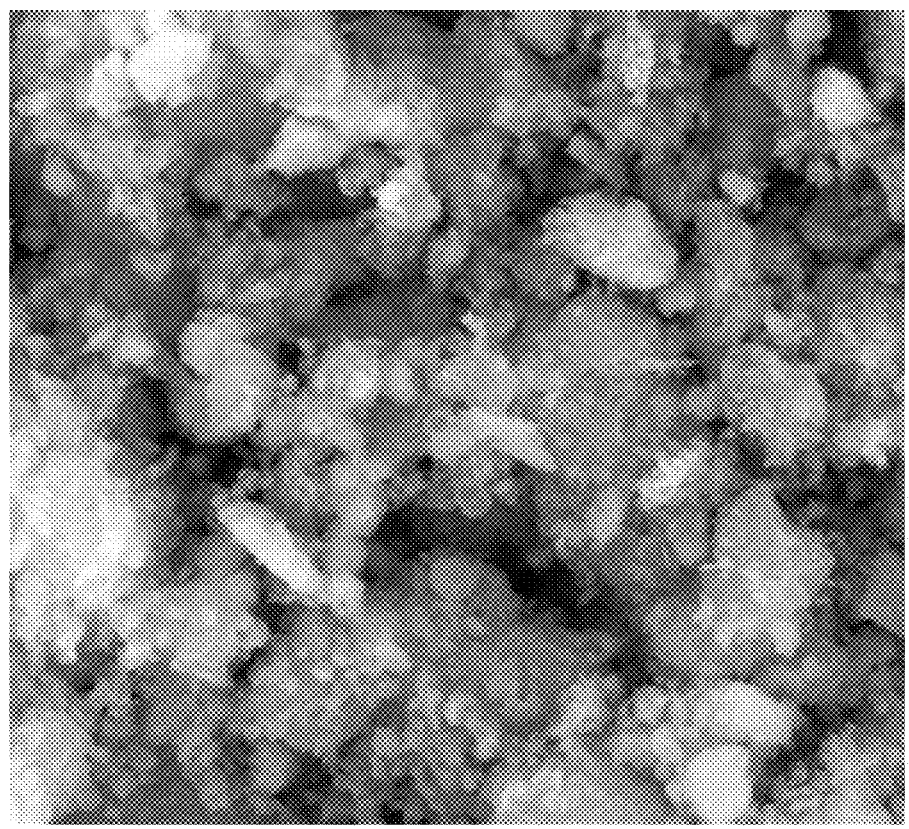
FIG. 3 shows micro-morphology of the modified hydrophobic red mud.

FIG. 3 shows micro-morphology of the modified hydrophobic red mud, i.e., a microstructure of the modified red mud at 30,000× magnification by a scanning electron microscopy. It can be seen that the red mud particles are nearly spherical and small, have a relatively rough surface texture and an unobvious edge. The relatively fine particles in the red mud tend to stick together, forming relatively large agglomerates.

Figure 4:
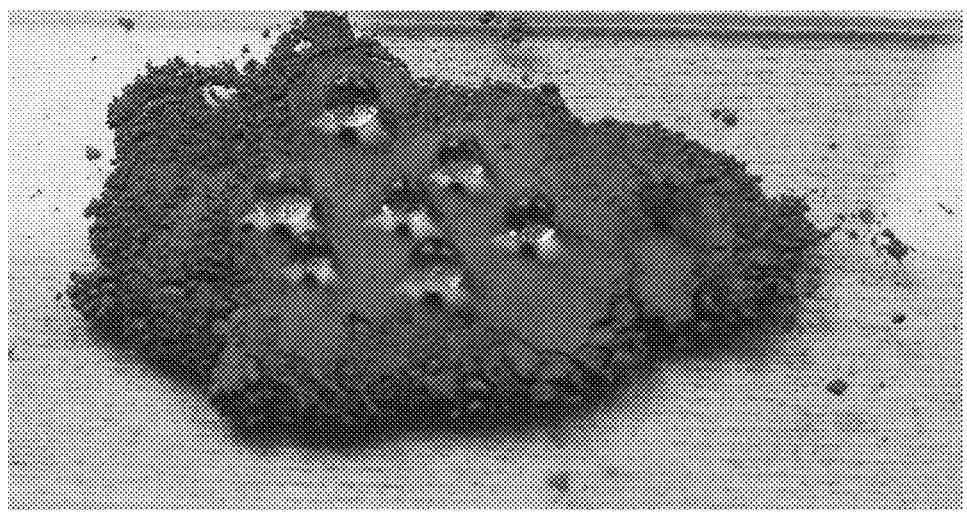
FIG. 4 is an actual measurement photo showing the hydrophobicity of water droplets on the modified red mud powder.

FIG. 4 is an actual measurement photo showing the hydrophobicity of water droplets on the modified red mud powder. It can be seen that the water droplets are spherical, indicating that the modified red mud powder has a hydrophobic surface.

Figure 5:
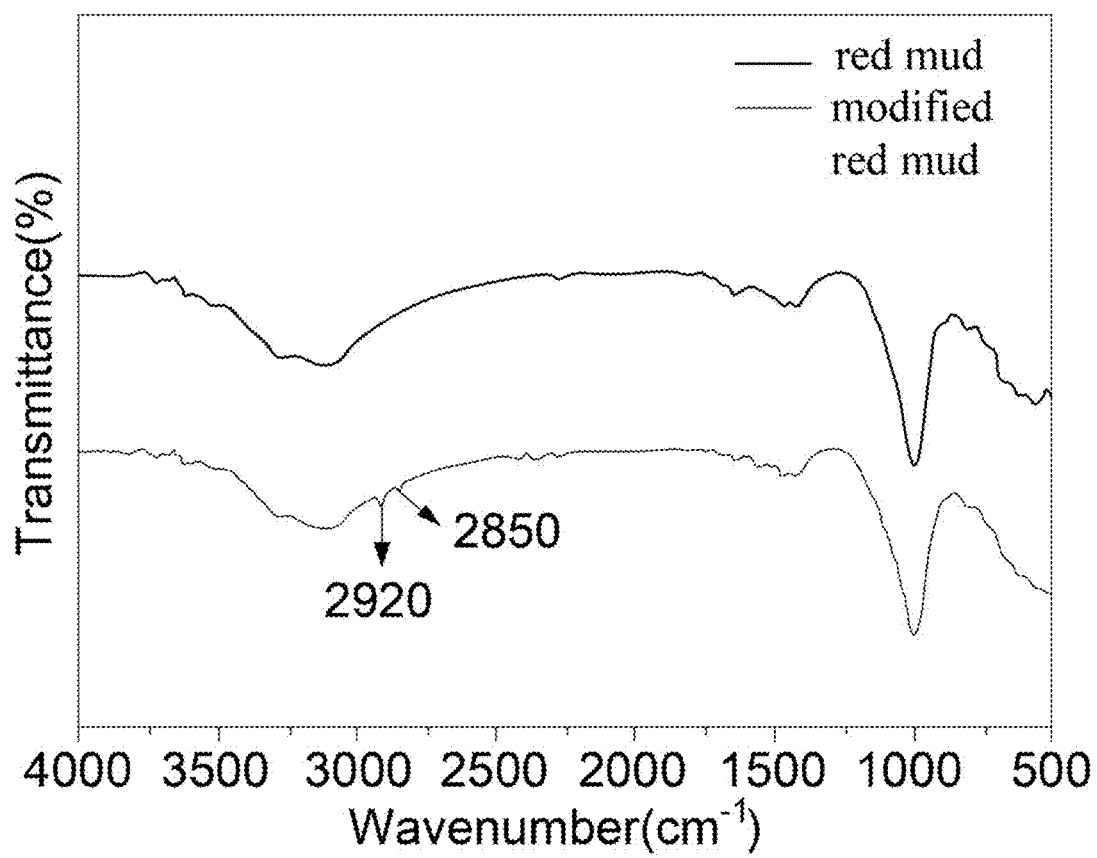
FIG. 5 shows Fourier data curves of red mud and the modified red mud.

FIG. 5 shows Fourier data curves of red mud and the modified red mud. From the comparison between the two curves, it can be seen that at 2920 $cm^{-1}$ and 2850 $cm^{-1}$, the modified red mud has two more stretching peaks, indicating that the modified red mud already has the —COOH hydrophobic group of stearic acid. That is to say, the stearic acid has been grafted onto the surface of the red mud, and thereby the red mud is successfully modified into hydrophobic red mud.

What is claimed is:

1. A method for preparing an alkaline red mud coating for preventing marine organism attachment, comprising the following steps:
(1) mixing stearic acid and absolute ethanol by stirring to obtain a mixed solution;
(2) fully mixing the mixed solution in step (1) and a red mud powder to obtain a mixture, and then drying the mixture to obtain a modified hydrophobic red mud powder;
(3) adding benzyl glycidyl ether into an epoxy resin and conducting dispersion to be uniform to obtain a mixed system, then adding the modified hydrophobic red mud powder in step (2) into the mixed system, continuing the dispersion to be uniform to obtain a blend, and grinding the blend to obtain an antifouling coating material; and
(4) during use, mixing the antifouling coating material in step (4) and a polyamide curing agent to obtain a mixture system, and applying the mixture system onto a surface of a building to form the alkaline red mud coating for preventing marine organism attachment;
wherein in step (1), a mass ratio of the stearic acid to the absolute ethanol is in a range of 1:(20-30);

in step (2), a mass ratio of the mixed solution to the red mud powder is in a range of (2-3): 1; and the drying is conducted in an oven;

in step (3), in parts by weight, an amount ratio of the benzyl glycidyl ether, the epoxy resin, and the modified hydrophobic red mud powder is in a range of (2-6):(50-70):(15-20); and in step (4), the polyamide curing agent is in an amount of 2-7% of a weight of the antifouling coating material.

2. The method for preparing the alkaline red mud coating for preventing marine organism attachment as claimed in claim 1, wherein in step (1), mixing stearic acid and absolute ethanol by stirring is conducted with a magnetic stirrer, and the stirring is conducted for 40 min to 60 min.

3. The method for preparing the alkaline red mud coating for preventing marine organism attachment as claimed in claim 1, wherein the epoxy resin in step (3) is a bisphenol A epoxy resin.

\* \* \* \* \*